United States Patent [19]

Baker

[11] Patent Number: 4,661,762
[45] Date of Patent: Apr. 28, 1987

[54] EMERGENCY POWER SYSTEM

[75] Inventor: Robert C. Baker, Loves Park, Ill.

[73] Assignee: Sundstrand Corporation, Rockford, Ill.

[21] Appl. No.: 875,459

[22] Filed: Jun. 18, 1986

[51] Int. Cl.$^4$ .......................... H02H 7/06; H02P 9/00; H02P 15/00

[52] U.S. Cl. ...................................... 322/40; 307/84; 307/87; 318/12; 322/29; 322/12

[58] Field of Search ................... 322/4, 29, 32, 38, 40, 322/12; 307/84, 87; 290/4 R, 4 C; 361/20, 21; 318/11, 12

[56] References Cited

U.S. PATENT DOCUMENTS

| | | | |
|---|---|---|---|
| 3,056,914 | 10/1962 | Potter | 322/40 |
| 4,074,180 | 2/1978 | Sharpe et al. | 307/87 X |
| 4,167,695 | 9/1979 | Phillips | 322/12 |
| 4,409,491 | 10/1983 | Schott | 307/87 X |
| 4,488,198 | 12/1984 | Christen et al. | 361/20 |
| 4,572,961 | 2/1986 | Borger | 322/40 |
| 4,585,949 | 4/1986 | Takahashi | 318/12 |

OTHER PUBLICATIONS

Article entitled "Electrically Compensated Aircraft Alternator Drive", by J. J. Cathey, published by IEEE 1983.

Primary Examiner—R. J. Hickey
Attorney, Agent, or Firm—Wood, Dalton, Phillips, Mason & Rowe

[57] ABSTRACT

An emergency power generating system according to the present invention includes an emergency power converter which is selectively coupled to the output of a permanent magnet machine forming a part of a constant speed drive in the event of a failure of a main generator so that the permanent magnet machine and the emergency power converter provide emergency power to one or more loads.

7 Claims, 1 Drawing Figure 4,661,762

EMERGENCY POWER SYSTEM

DESCRIPTION

1. Technical Field

The present invention relates generally to power generating systems, and more particularly to a system for generating emergency electrical power in the event of failure of a generating system.

2. Background

Generating systems for generating electrical power from motive power supplied by a variable speed prime mover utilize either a constant speed drive or complex electrical power converter circuits to develop constant frequency alternating current power. An example of the prior type of system is disclosed in Dishner et al U.S. patent application Ser. No. 812,396, filed Dec. 12, 1985, entitled "Power Converter for an Electrically-Compensated Constant Speed Drive" now abandoned, assigned to the assignee of the instant application and the disclosure of which is hereby incorporated by reference.

The generating system disclosed in the above referenced Dishner et al patent application includes an electrically-compensated constant speed drive which converts variable speed motive power developed by a prime mover into constant speed motive power for driving a load, such as a generator. The constant speed drive includes a differential speed summer having a first input coupled to the output of the prime mover. The prime mover output is also coupled to a motive power shaft of a first permanent magnet machine. A second input of the differential is coupled to a motive power shaft of a second permanent magnet machine. Electrical power windings of the permanent magnet machines are interconnected by a power converter which manages the flow of power between the machines so that the second permanent magnet machine develops compensating speed of a magnitude and direction which causes the output shaft of the differential to be driven at a desired constant speed. The generator is coupled to the output shaft of the differential to provide constant frequency alternating current power.

Other types of constant speed drive systems have been devised, such as those disclosed in Potter U.S. Pat. No. 3,056,914 and an article by Dr. J. J. Cathey in a publication of the IEEE (copy filed herewith).

Occasionally, a failure may arise in one or more components of the generating system. In such a case, it may be necessary to decouple the generator from the prime mover so that damage to the generator is minimized and/or so that the prime mover may continue to drive other generating systems. Various types of disconnect units have been devised to accomplish this decoupling function. One example of such a unit is disclosed in Phillips U.S. Pat. No. 4,167,695. When such action becomes necessary, it would be desirable to have a source of emergency power to provide at least limited electrical power to various loads.

DISCLOSURE OF INVENTION

In accordance with the present invention, a power generating system such as that disclosed in the above-referenced Dishner et al patent application may be provided with circuitry to develop emergency power in the event of a failure of the generator.

More specifically, a generating system of the type described above may be provided with a disconnect unit coupled between the prime mover and the differential speed summer, which unit is operated by a control unit to decouple the generator from the prime mover in the event of a failure of the generator or another component in the generating system. Means are provided for electrically isolating the first permanent magnet machine from the second permanent magnet machine as well as means for coupling the electrical power windings of the first permanent magnet machine to an emergency power converter when such failure occurs. Thereafter, the emergency power converter is operated in a failure mode of operation whereby the first permanent magnet machine and the emergency power converter provide emergency power to various loads.

If desired, the first permanent magnet machine may be disposed remotely from the remaining components of the generating system in a separate housing. In this case, the disconnect unit is not needed and can be omitted.

BEST MODE FOR CARRYING OUT THE INVENTION

Figure 1:
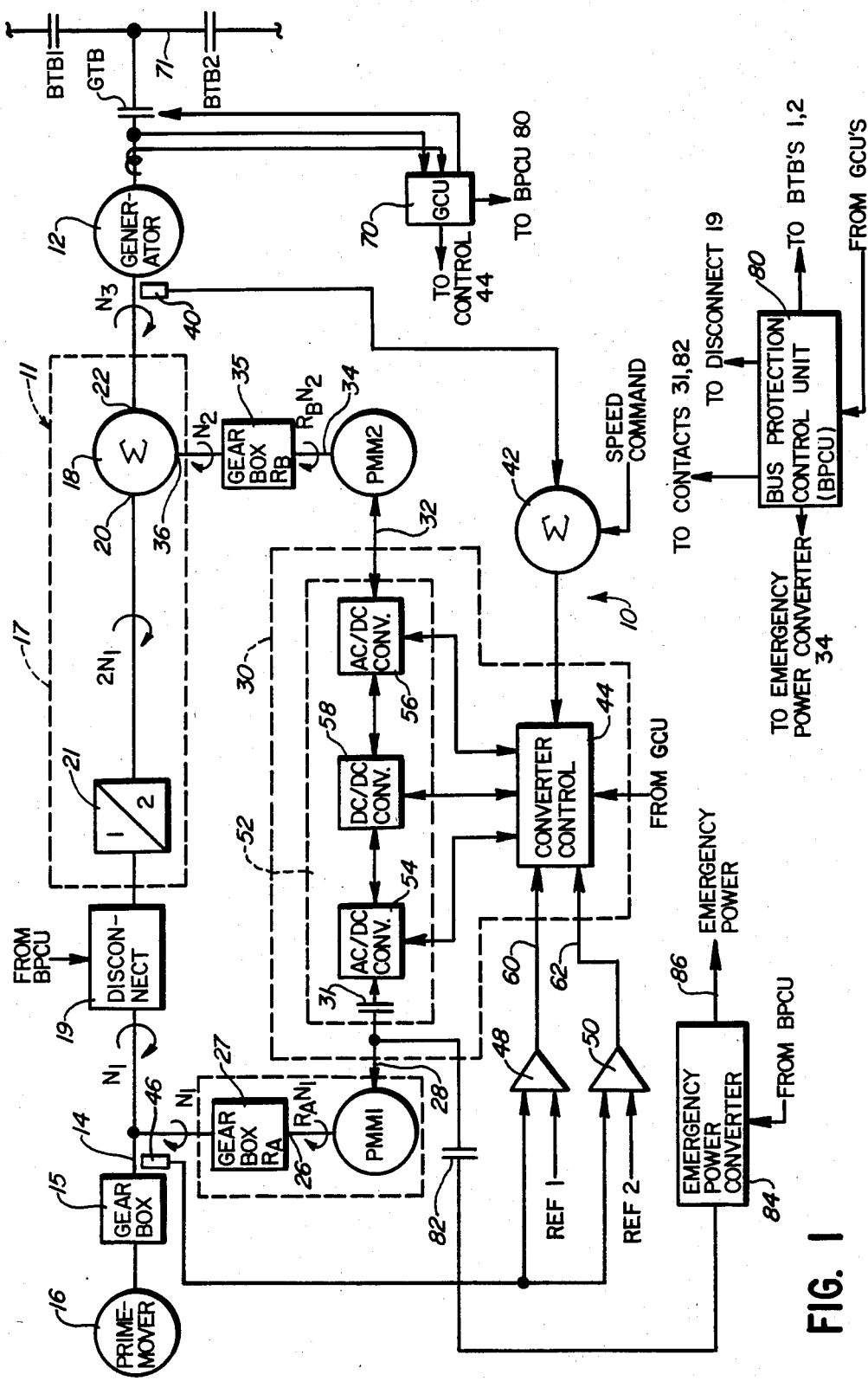
FIG. 1 is a block diagram of an electrically-compensated constant speed drive including the emergency power system of the present invention.

Referring now to FIG. 1, there is illustrated a generating system 10 which includes an electrically-compensated constant speed drive 11 for driving a generator 12 at a desired constant speed so that constant frequency AC main generator power is developed to energize one or more loads. The constant speed drive 11 receives variable speed motive power from a shaft 14 which is coupled by a gear box 15 to an output shaft of a variable speed prime mover 16. The shaft 14 is coupled to a mechanical differential 17 having a speed summer 18 via a mechanical disconnect unit 19. The differential 17 accomplishes a 2:1 speed increase which is represented by the block 21 in FIG. 1. The speed summer further includes an output shaft 22 which is coupled to the generator 12.

A first or control permanent magnet machine PMM1 includes a motive power shaft 26 which is coupled by a gear box 27 to the output shaft 14 of the gear box 15. The PMM1 further includes electrical power windings which are coupled by a series of conductors 28 to a power converter 30. A set of breaker contacts 31 are disposed in the conductors 28 to provide electrical isolation when necessary, as noted more specifically below.

A second or speed-compensating permanent magnet machine PMM2 includes electrical power windings which are coupled by a series of conductors 32 to the power converter 30. The PMM2 further includes a motive power shaft 34 which is coupled through a gear box 35 to a second input 36 of the differential speed summer 18.

The gear boxes 27, 35 are speed multipliers having speed ratios of $R_A$ and $R_B$, respectively. More specifically, if $N_1$ is the speed of the output shaft 14 of the gear box 15, the speed of the motive power shaft 26 of the PMM1 is equal to $R_A N_1$. Likewise, if the speed of the shaft coupled to the input 36 of the speed summer 18 is $N_2$, then the speed of the motive power shaft 34 of the PMM2 is equal to $R_B N_2$. Gear box 27 effects a speed increase while gear box 35 effects a speed reduction.

The speed of the output shaft 22 of the speed summer 18 is detected by a speed sensor 40. The speed sensor 40 develops a speed signal which is coupled to one input of a summing junction 42. A second input of the summing junction 42 receives a speed command signal representing the desired output speed of the speed summer 18. The summing junction 42 compares (i.e. subtracts) the two signals at the inputs and develops a speed error signal representing the difference between the actual output speed of the speed summer 18 and the commanded speed. The speed error signal is coupled to a converter control circuit 44 which is a part of the power converter 30.

The speed of the output shaft 14 of the gear box 15 is detected by a second speed sensor 46 which develops a signal representative thereof. This signal is coupled to noninverting inputs of first and second threshold comparators 48,50. The comparators 48,50 include inverting inputs which receive reference signals REF1 and REF2, respectively. The outputs of these comparators are coupled to the converter control circuit 44 in the power converter 30.

The power converter 30 further includes power switching circuitry 52 which is controlled by the converter control 44. The power switching circuitry 52 comprises a first bi-directional AC/DC converter 54 which is coupled to the electrical power windings of the PMM1 by the conductors 28, a second bi-directional AC/DC converter 56 coupled to the electrical power windings of the PMM2 by the conductors 32 and a bi-directional DC/DC converter 58 which is coupled between and interconnects the AC/DC converters 54,56.

The converter control 44 also receives an enable signal from a generator control unit or GCU 70 which senses the output current and voltage of the generator 12. The generator control unit controls a generator tie breaker GTB which is coupled between the output of the generator 12 and a power distribution bus 71. The power distribution bus 71 may be coupled through bus tie breakers BTB1 and BTB2 to one or more load buses and/or one or more generating systems.

The GCU 70 also controls a further disconnect unit (not shown) which is coupled between the gear box 15 and the differential 17. The further disconnect unit is provided in the event of a catastrophic failure of the generating system and may comprise, for example, a shear section which rapidly decouples the generator from the prime mover under control of the GCU 70.

Briefly, under normal operating conditions, the contacts 31 are closed and the GCU 70 provides the enable signal to the converter control 44. In response to this enable signal, the converter control 44 operates the converters 54-58 in one of a plurality of modes of operation to control the transfer of power between the permanent magnet machines PMM1 and PMM2 so that the speed-compensating PMM2 drives the shaft coupled to the input 36 at a magnitude of speed and direction which causes the speed of the output 22 to be maintained at a desired speed.

The comparators 48,50 vary the operation of the converter control circuit and the power switching circuitry 52 in dependence upon the speed $N_1$ of the shaft 14. More specifically, the speed $N_1$ may be such that it is necessary to operate the PMM1 as a generator and the PMM2 as a motor to provide compensating speed to the input 36 of the speed summer 18. In this case, the converter 54 is operated as a full bridge rectifier while the converter 56 is operated as an inverter under control of the converter control circuit 44.

On the other hand, the speed $N_1$ may be such that the PMM2 must be operated as a generator and the PMM1 must be operated as a motor, in which case the converter 56 is operated as a rectifier while the converter 54 is operated as an inverter.

Furthermore, the operation of the DC/DC converter 58 is varied as a function of the speed $N_1$ so that the proper voltage is applied to the converter 54,56 which is operating as an inverter.

A more complete description of the operation of the electrically-compensated constant speed drive illustrated in FIG. 1 is contained in the above-referenced Dishner et al application.

A bus protection control unit, or BPCU 80 controls the bus tie breakers BTB1 and BTB2 as well as the disconnect unit 19, the contacts 31, a set of contacts 82 and an emergency power converter circuit 84 which is coupled by the contacts 82 to the output of the PMM1.

The BPCU 80 receives inputs from the GCU 70 and other GCU's which control the remaining generator systems coupled to the power distribution bus 71.

When the bus protection control unit 80 receives a signal from the GCU 70 indicating that a failure has occurred in the generating system, the BPCU 80 actuates the disconnect unit 19 to decouple the prime mover 16 from the generator 12. In addition, the BPCU 80 opens the contacts 31 to electrically isolate the electrical power windings of the PMM1 from the power converter 30 and closes the contacts 82 to connect the power windings of the PMM1 to the emergency power converter 84. Also, the BPCU 80 provides an enable signal to the emergency power converter 84 to cause it to develop either AC or DC emergency power, as desired, on an emergency power bus 86. One or more loads may be coupled to the power bus 86 by means of contactors, as desired.

The emergency power converter 84 may be any suitable type of power converter which provides the desired power output. For example, the power converter may comprise a phase controlled rectifier and filter, a full-wave bridge uncontrolled rectifier and filter, a cycloconverter, a rectifier-inverter combination (also known as a DC link inverter) or the like. In those cases where the converter includes controlled switches, appropriate control circuitry would be required to obtain the desired output.

In the embodiment illustrated in FIG. 1, the PMM1 is disposed within the same housing as the remaining components of the electrically-compensated constant speed drive with a divider wall 100, illustrated by the dotted lines, enclosing the PMM1 and the gear box 27. It should be noted that the PMM1 may be disposed remotely from the remaining components of the constant speed drive in a separate housing therefrom, in which case the disconnect unit 19 is not needed since the PMM1 is sufficiently isolated in this event from faults which may affect the remaining components of the generating system. This desirably leads to a reduction in the size and weight of the overall system.

What is claimed is:

1. A generating system driven by a source of motive power, comprising:
    a first permanent magnet machine having a motive power shaft coupled to an output shaft of the motive power source and further having electrical power windings;

a disconnect unit having an input shaft coupled to the output shaft of the motive power source and an output shaft;

a differential having a first input shaft coupled to the output shaft of the disconnect unit, a second input shaft and an output shaft;

a second permanent magnet machine having a motive power shaft coupled to the second input shaft of the differential and further having electrical power windings;

a generator coupled to the output shaft of the differential;

a power converter interconnecting the electrical power windings of the first and second permanent magnet machines; and means for operating the power converter and the disconnect unit in a normal mode of operation wherein the differential output shaft rotates at a constant speed and in a failure mode of operation whereby the disconnect unit is actuated to decouple the motive power source from the differential and to operate the first permanent magnet machine to provide emergency power.

2. The generating system of claim 1, further including an emergency power converter coupled to the electrical power windings of the first permanent magnet machine.

3. The generating system of claim 1, further including means for isolating the electrical power windings of the first permanent magnet machine from the power converter when in the failure mode of operation.

4. The generating system of claim 1, further including an emergency power converter and means for selectively coupling the emergency power converter to the electrical power windings of the first permanent magnet machine when the disconnect unit is actuated.

5. A generating system driven by a source of motive power, comprising:

a first permanent magnet machine having a motive power shaft coupled to an output shaft of the motive power source and further having electrical power windings;

a differential having a first input shaft coupled to the output shaft of the motive power source, a second input shaft and an output shaft;

a second permanent magnet machine having a motive power shaft coupled to the second input shaft of the differential and further having electrical power windings;

a generator coupled to the output shaft of the differential;

a power converter interconnecting the electrical power windings of the first and second permanent magnet machines;

an emergency power converter;

means for isolating the power windings of the first permanent magnet machine from the power windings of the second permanent magnet machine when a fault arises in the generating system; and means for coupling the emergency power converter to the power windings of the first permanent magnet machine when the fault arises wherein emergency power is produced at an output of the emergency power converter during the existence of such fault.

6. The generating system of claim 5, further including a mechanical disconnect unit coupled between the motive power output shaft and the differential and means for actuating the disconnect unit to decouple the generator from the motive power source when the fault arises.

7. The generating system of claim 5, wherein the first permanent magnet machine is disposed in a housing separate from and remote from the remainder of the generating system.

* * * * *